United States Patent [19]

Fluck

[11] 4,212,580
[45] Jul. 15, 1980

[54] BOAT LAUNCHER FOR TRUCK BED

[76] Inventor: Ronald O. Fluck, 7th and Vine Sts., Perkasie, Pa. 18944

[21] Appl. No.: 919,554

[22] Filed: Jun. 27, 1978

[51] Int. Cl.² .............................. B60P 1/04; B60P 1/52
[52] U.S. Cl. ........................................ 414/522; 9/1.2; 298/1 A; 414/538; 414/559
[58] Field of Search .................... 414/537–538, 414/462, 500, 477–479, 482–485, 522; 296/1 A; 298/1 A; 254/166; 280/179 R, 414 R; 9/1.2, 1.5

[56] References Cited

U.S. PATENT DOCUMENTS

| 748,212 | 12/1903 | Patterson | 280/179 R |
|---|---|---|---|
| 2,787,476 | 4/1957 | Holsclaw | 280/179 R |
| 2,830,717 | 4/1958 | Posey | 414/479 R |
| 3,127,041 | 3/1964 | Flynn et al. | 414/478 |
| 3,411,644 | 11/1968 | Cook | 414/500 |
| 3,550,800 | 12/1970 | Robinson | 414/462 |
| 3,687,314 | 8/1972 | Haugland | 414/537 |
| 3,826,534 | 7/1974 | Ruff | 298/1 A |
| 3,842,998 | 10/1974 | Borum | 9/1.2 |

*Primary Examiner*—Stephen G. Kunin
*Assistant Examiner*—Lawrence E. Williams
*Attorney, Agent, or Firm*—O'Brien Clarence A.; Harvey B. Jacobson

[57] ABSTRACT

A loading and support rack is provided for support from the rear of a pickup truck load bed and with the rack overlying and extending forwardly of the tailgate of the pickup truck when the tailgate is in a horizontal position. A horizontal transverse winch mounting structure is provided for support from the upper marginal edge portion of the forward wall of the truck bed and includes a winch supported from the mid-portion thereof and vertical stakes supported from the opposite ends thereof snugly downwardly receivable in the upwardly opening stake sockets of the side walls of a pickup load bed closely adjacent the forward end of the bed. An elongated support frame is also provided and includes front and rear ends, dependingly supported ground engageable wheels supported from opposite side portions of its rear end, slightly dependingly supported opposite side forward support wheels and a center rear roller as well as opposite side rollers spaced centrally intermediate the opposite ends of the frame. In addition, the forward end of the frame includes an upper horizontal transverse member beneath which the bow of a boat supported from the frame may be received and opposite side portions of the rear end of the tailgate supported rack include rollers along which opposite side longitudinal members of the boat supporting frame may roll with a boat supported thereon, to which boat the free end of the winch cable is attached for pulling the boat as well as the boat supporting frame up onto and in the load bed of the pickup truck.

15 Claims, 11 Drawing Figures

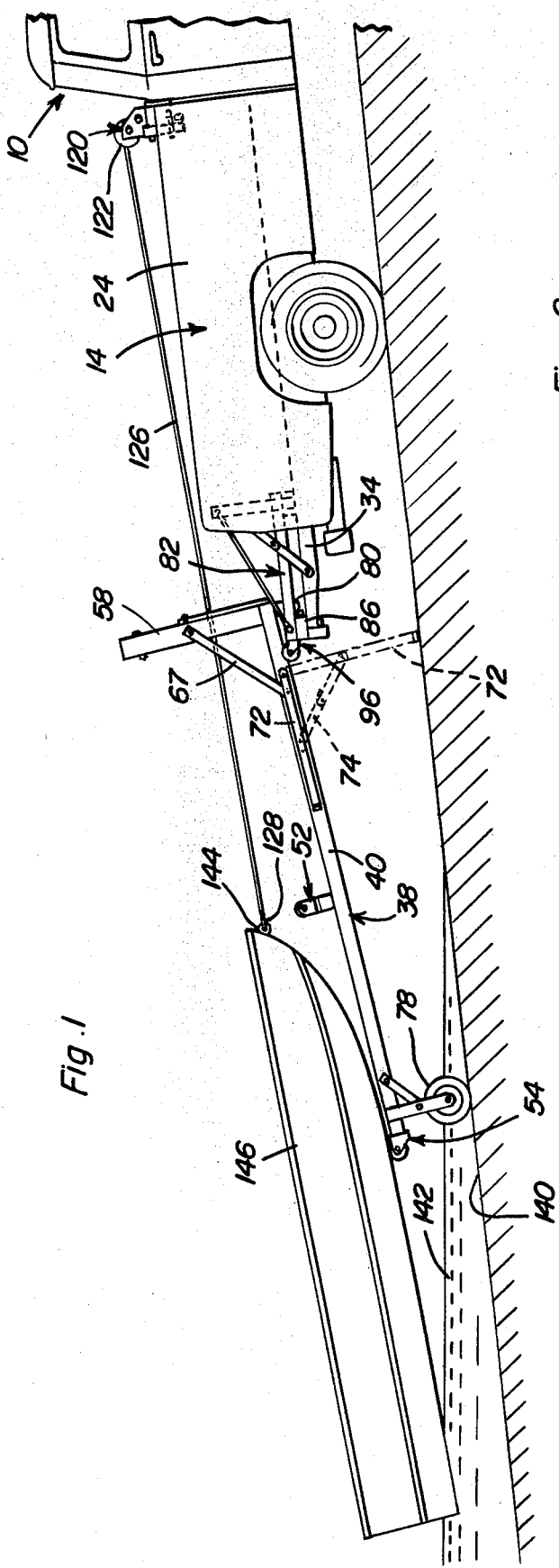
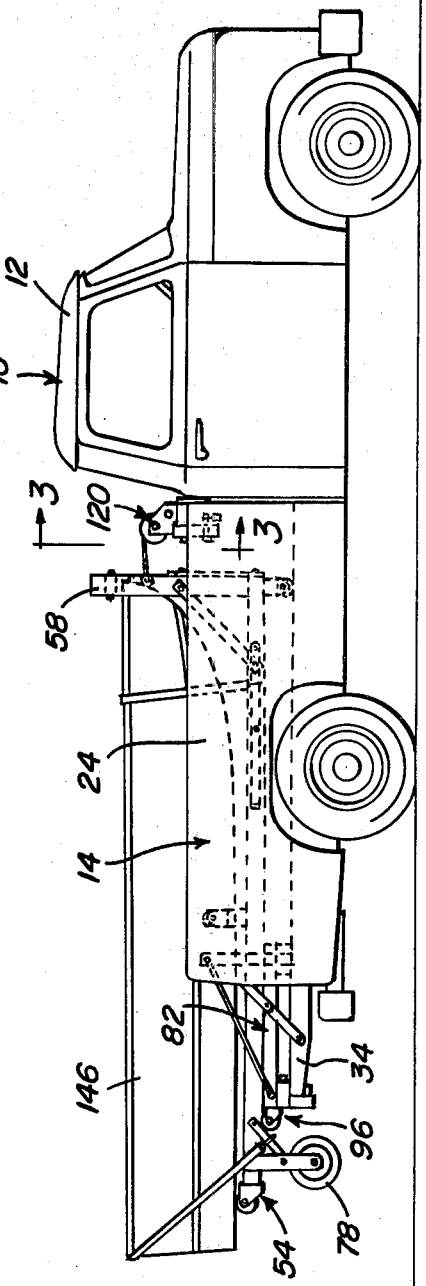
Fig. 1
Fig. 2

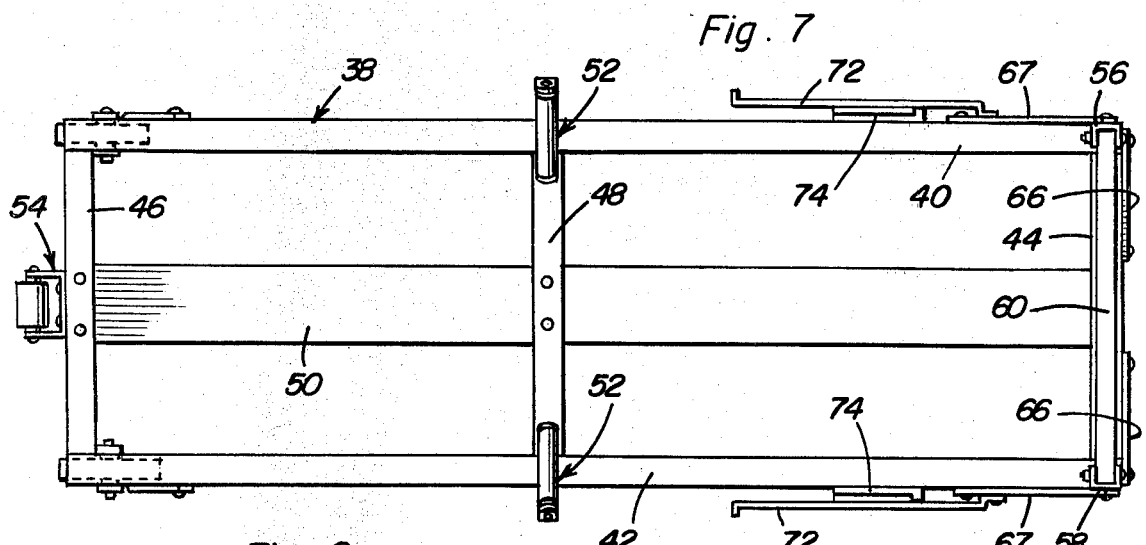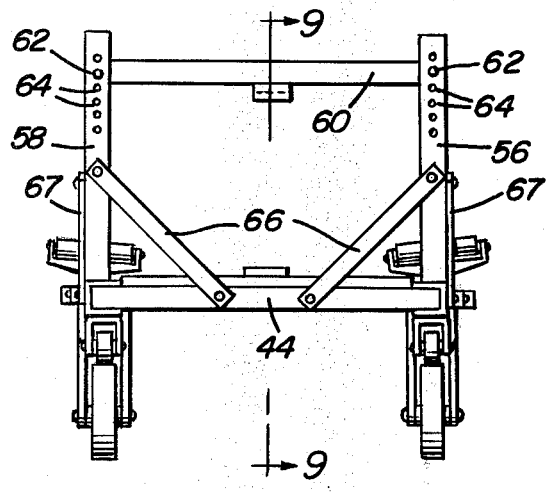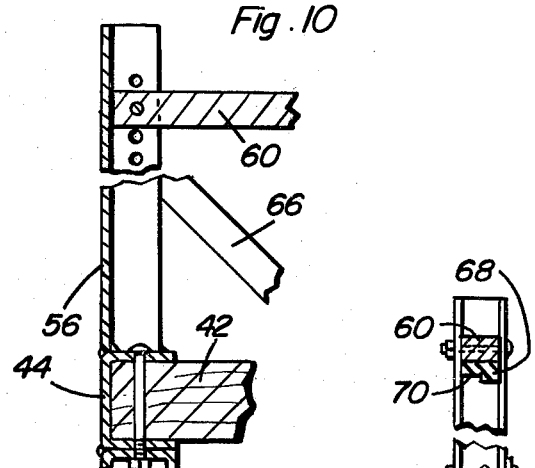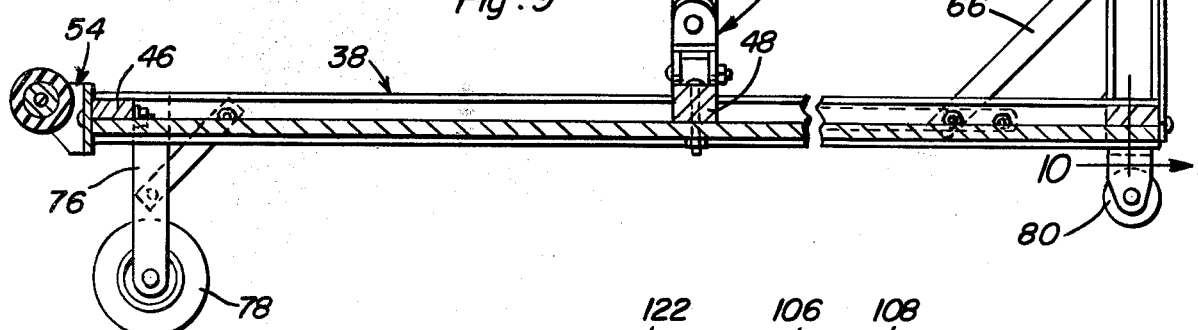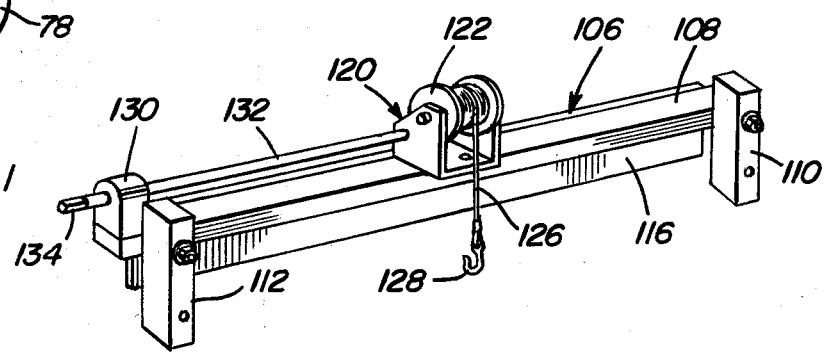

BOAT LAUNCHER FOR TRUCK BED

BACKGROUND OF THE INVENTION

Many persons own relatively small and lightweight boats as well as pickup trucks. While such small and lightweight boats may be lifted, by several men, into the load bed of a pickup truck for transport, one or two men are unable to perform such a loading operation with ease and sufficient care to prevent damage to the boat being loaded. In addition, many persons who own small and lightweight boats do not feel that is desirable to trail their small and lightweight boats on trailers towed behind their pickup trucks. Accordingly, a need exists for a means whereby a small and lightweight boat may be readily loaded into and unloaded from a pickup truck by a single person.

Examples of various forms of auxiliary load beds for pickup trucks to be utilized in loading and unloading various forms of loads onto and from pickup trucks are disclosed in U.S. Pat. Nos. 1,567,478, 1,677,723, 2,389,338, 3,221,913, 3,411,644 and 3,883,020.

BRIEF DESCRIPTION OF THE INVENTION

The boat handling apparatus of the instant invention includes two relatively inexpensive components for support from an associated pickup and a relatively inexpensive wheeled cradle for a small lightweight boat. The truck mounted components and the boat supporting cradle are so constructed whereby a small and lightweight boat may be readily transported in the load bed of a pickup truck and unloaded therefrom with ease by a single person as well as easily reloaded onto the associated pickup truck.

The main object of this invention is to provide an apparatus enabling a small lightweight boat to be loaded onto and unloaded from a pickup truck.

Another object of this invention is to provide a boat handling apparatus for use in conjunction with pickup trucks and which may be readily operated by a single person to load and unload a boat onto and from a pickup truck load bed.

Another important object of this invention is to provide an apparatus in accordance with the preceding objects and which will require no permanent attachments of any portions of the apparatus to the associated pickup truck and which, in fact, will require only the placement of the two pickup truck mounted components on the latter without the use of any fastening means.

A further object of this invention is to provide an apparatus in accordance with the preceding objects which may be readily adapted for use in conjunction with many different makes and models of pickup trucks.

Still another object of this invention is to provide an apparatus in accordance with the preceding objects and wherein one of the pickup truck mounted components thereof may be utilized, independent of the other components, to load various other heavy articles onto the associated pickup truck load bed.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of the rear portion of a pickup truck equipped with the apparatus of the instant invention and with the apparatus being utilized in the initial boat loading phase of operation thereof;

FIG. 2 is a side elevational view of the pickup truck with the apparatus of the instant invention supporting and securing a pickup truck in the pickup truck load bed;

FIG. 7 is a top plan view of the small boat supporting frame or cradle component of the instant invention;

FIG. 8 is a front elevational view of the boat supporting cradle component on somewhat of a reduced scale;

FIG. 9 is an enlarged fragmentary longitudinal vertical sectional view taken substantially upon the plane indicated by the section line 9—9 of FIG. 8;

FIG. 10 is an enlarged fragmentary transverse vertical sectional view taken substantially upon the plane indicated by the section line 10—10 of FIG. 9; and FIG. 11 is a perspective view of the forward pickup truck mounted component of the instant invention.

Figure 3:
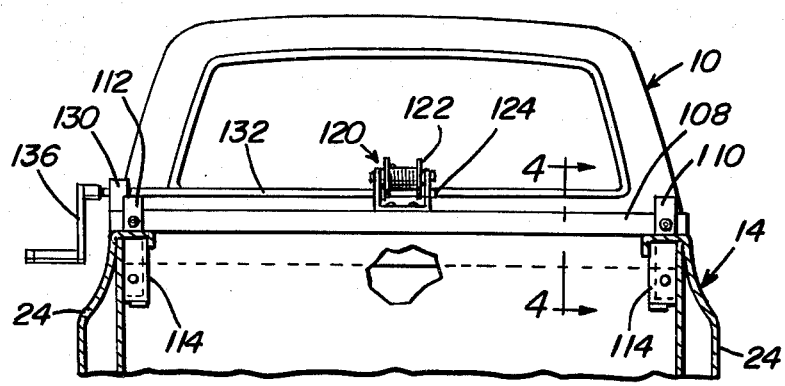
FIG. 3 is a fragmentary enlarged transverse vertical sectional view taken substantially upon the plane indicated by the section line 3—3 of FIG. 2.

Referring now more specifically to the drawings the numeral 10 generally designates a conventional form of pickup truck. The pickup truck 10 includes a forward cab 12 and a rear load bed referred to in general by the reference numeral 14. The cab 12 includes a rear transverse wall 16 and the load bed 14 includes a forward transverse wall 18 spaced slightly rearwardly of the wall 16 and including an upper marginal portion 20. The load bed 14 additionally includes a pair of upstanding opposite side walls 22 and 24 extending rearwardly from the forward wall 18 and including upper marginal edges 26 and 28. Further, the load bed 14 additionally includes a floor 30 extending between the opposite side walls 22 and 24 rearwardly of the front wall 18 and the rear ends of the opposite side walls 22 and 24 include rear structural posts 32. Also, the load bed 14 includes the usual tailgate 34 hingedly supported at the rear marginal edge of the floor 30 between the lower ends of the rear marginal portions of the opposite sides 22 and 24 and the tailgate 34 is swingable from a closed upstanding position extending between the rear ends of the side walls 22 and 24 and a rearwardly projecting open horizontal position defining a rearward extension of the floor 30, the tailgate 34 being braced by means of opposite side articulated braces 36 connected between the opposite sides 22 and 24 and the tailgate 34.

The foregoing comprises a description of a conventional form of pickup truck.

With reference now more specifically to FIGS. 7 through 10 of the drawings, a generally horizontal boat supporting cradle or frame is referred to in general by the reference numeral 38. The frame 38 is generally rectangular and includes opposite side longitudinal members 40 and 42 interconnected at their forward ends by means of a front horizontal transverse member 44 extending and secured therebetween. In addition, the rear ends of the members 40 and 42 are interconnected by means of a rear horizontal transverse member 46 extending and connected therebetween.

Longitudinal mid-portions of the longitudinal members 40 and 42 are interconnected by means of a central transverse brace member 48 extending and secured therebetween and a center walkway member 50 extends along the longitudinal center line of the cradle or frame 38 and has its rear end portion underlying and secured to the central portion of the rear transverse member 46, its forward end underlying and secured to the central portion of the front transverse member 44 and the longitudinal mid-portion of the walkway member 50 underlies and is secured to the mid-portion of the transverse brace member 48.

The opposite end portions of the transverse brace member 48 oscillatably support opposite side roller assemblies 52 of the cradle or frame 38 therefrom and the central portion of the rear transverse member 46 supports a rear roller assembly referred to in general by the reference numeral 54 therefrom.

The forward ends of the opposite side longitudinal members 40 and 42 include upright posts 56 and 58 supported therefrom. The upper ends of the posts 56 and 58 are interconnected by means of an elevated horizontal transverse brace member 60 extending and secured therebetween and the opposite ends of the brace member 60 are anchored relative to the corresponding posts 56 and 58 by means of fasteners 62 removably secured through selected vertically spaced bores 64 formed in the posts 56 and 58. In addition, the posts 56 and 58 are braced relative to the front transverse member 44 and the longitudinal side members 40 and 42 by angled brace members 66 extending and secured between the front brace member 44 and the corresponding posts 56 and 58 and angled brace members 67 extending and secured between the posts 56 and 58 and the side members 40 and 42. The central portion of the brace member 60 includes a resilient block 68 supported from the underside thereof including a rearwardly and downwardly opening notch 70. Also, and with attention invited more specifically to FIGS. 1 and 7 of the drawings, pivoted legs 72 are supported from the forward ends of the longitudinal members 40 and 42 and include articulated braces 74 connected between the legs 72 and the longitudinal members 40 and 42 for releasably retaining the legs 72 in the depending operative positions thereof ilustrated in phantom lines in FIG. 1, the legs 72 being upwardly retractable to the solid line positions thereof illustrated in FIGS. 1 and 7 generally paralleling the outer side surfaces of the longitudinal members 40 and 42.

The rear end of the cradle or frame 38 includes opposite side rear depending legs 46 from whose lower ends support wheels 78 are journalled and the forward end of the cradle or frame 38 includes only slightly depending and journalled support wheels 80.

Figure 5:
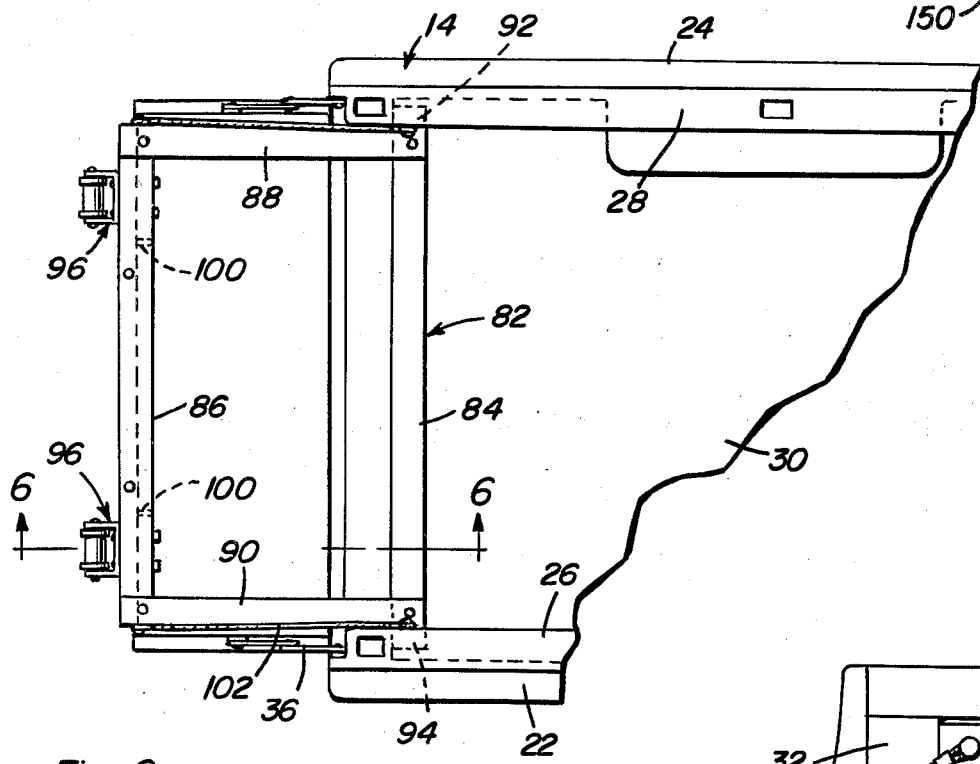
FIG. 5 is a fragmentary top plan view of the rear portion of a pickup truck load bed illustrating the rear load bed supported component of the apparatus of the instant invention.
Figure 6:
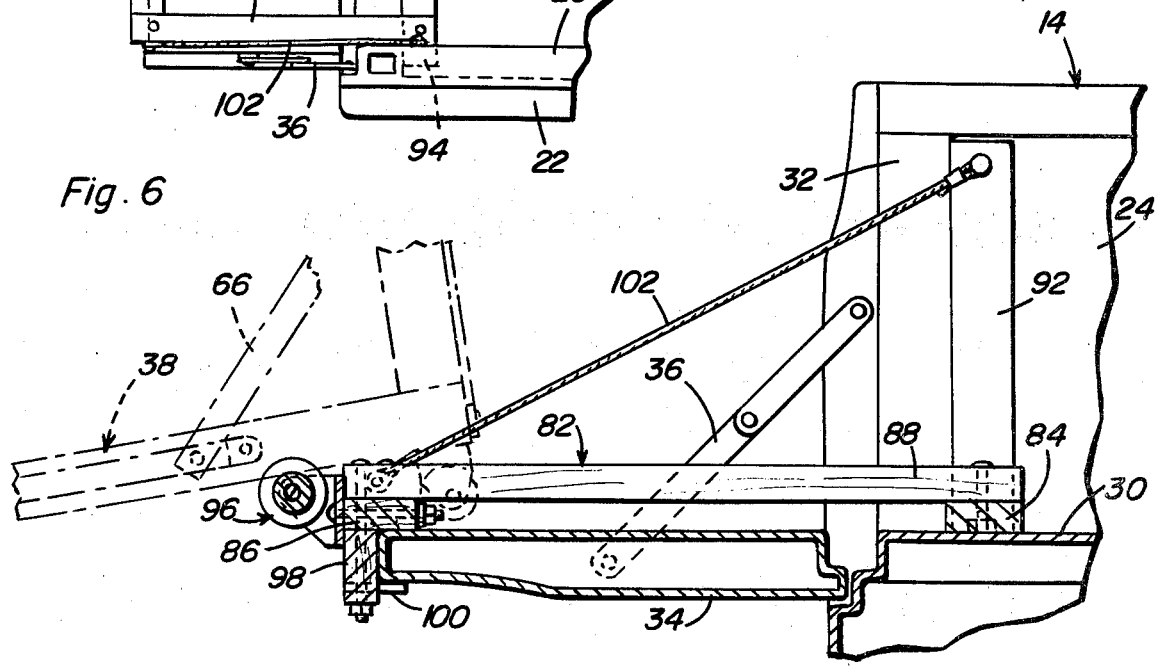
FIG. 6 is an enlarged fragmentary longitudinal vertical sectional view taken substantially upon the plane indicated by the section line 6—6 of FIG. 5.

With attention now invited more specifically to FIGS. 5 and 6 of the drawings, a support rack referred to in general by the reference numeral 82 is provided and includes a generally rectangular frame including front and rear transverse members 84 and 86 interconnected by means of opposite side longitudinal members 88 and 90. The opposite ends of the forward transverse member 84 project outwardly beyond the remote sides of the longitudinal members 88 and 90 and include uprights 92 and 94 supported therefrom outwardly of the forward ends of the longitudinal members 88 and 90. Further, the rear transverse member 38 supports a pair of opposite side lower assemblies 96 therefrom and includes a depending transverse abutment 98 and the opposite end portions of the abutment 98 include forwardly projecting abutments 100. Further, elongated inclined tension members 102 extend between and are anchored relative to the upper ends of the uprights 92 and 94 and the opposite side portions of the rear of the frame 82.

It may be seen from FIG. 6 of the drawings that the frame 82 overlies the tailgate 34 when the latter is in the horizontal position thereof and that when the abutment 98 forwardly abuts the rear edge of the tailgate with the rear transverse member 86 abuttingly supported from the upper surface of the tailgate 34, the forwardly projecting abutments 100 underlie the rear marginal edge of the tailgate 34. Further, the opposite end portions of the forward transverse member 84 are disposed immediately forwardly of the lower ends of the posts 32 and the uprights 92 and 94 extend upwardly along and rearwardly abut the forward sides of the posts 32. Accordingly, it may be seen that the frame 82, with the opposite side longitudinal members 88 and 90 thereof snugly received between the rear marginal portions of the sides 22 and 24, is supported in position from the pickup truck 10 against shifting relative thereto. In fact, inasmuch as the upper marginal edge portions 26 and 28 of the side walls 22 and 24 overlie the upper ends of the uprights 92, the frame 82 may not be dislodged from its supported position as illustrated in FIGS. 5 and 6 without the tailgate 34 being swung slightly upwardly to a position inclined approximately 45° relative to the horizontal, whereupon the free swinging edge of the tailgate 34 will be withdrawn from between the abutments 100 and the opposing underside portions of the rear transverse member 86. At this point, the frame 82 may be further upwardly displaced toward an upright position and angularly displaced about an upstanding axis so as to swing one of the posts 92 and 94 outwardly from beneath the corresponding side wall upper marginal portion.

Figure 4:
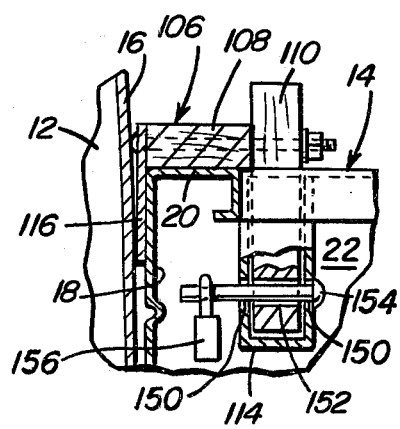
FIG. 4 is an enlarged fragmentary transverse vertical sectional view taken substantially upon the plane indicated by the section line 4—4 of FIG. 3 and with portions of the illustrated load bed stake receiving socket broken away and illustrated in vertical sections.

Referring now more specifically to FIGS. 3, 4 and 11 of the drawings, a third component of the instant invention referred to in general by the reference numeral 106 is provided and comprises a loading assembly for the load bed 10. The loading assembly 106 includes a horizontal transverse member 108 from whose opposite ends upstanding stakes 110 and 112 are supported with the stakes 110 and 112 abutted against and secured to the rear side of the opposite ends of the transverse member 108. The stakes 110 and 112 are downwardly receivable in the conventional upwardly opening stake sockets 114 defined by the forward ends of the side walls 22 and 24 of the pickup truck load bed 14 immediately rearwardly of the front wall 18 thereof. When the stakes 110 and 112 are downwardly seated in the sockets 114, the underside of the front transverse member 108 downwardly abuts the upper marginal edge 20 of the front wall 18. Further the forward side of the transverse member 108 has a depending anchor flange 116 secured thereto and the anchor flange 116 extends downwardly in front of and rearwardly abuts the forward side of the upper marginal portion of the front wall 18 between the front wall 18 and the rear wall 16 of the cab 12.

The center portion of the transverse member 108 has a winch assembly referred to in general by the reference numeral 120 supported therefrom and the winch assembly 120 includes a cable drum 122 and a torque input shaft 124 which may be rotated to effect rotation of the drum 122 upon which a winch cable 126 is wound, the free end of the cable 126 including an anchor hook 128.

The left end portion of the transverse member 108 includes a bearing journal 130 and an extension shaft 132 has one end thereof drivingly coupled to the torque input shaft 124 and the other end portion journalled from the journal 130. Further, the end of the extension shaft 132 remote from the winch assembly 120 includes a non-circular end portion 134 upon which a crank 136 is removably mounted. Therefore, the drum 122 of the winch assembly 120 may be rotated by means of the crank 136 disposed at the left hand forward corner of the load bed 14.

With attention now invited more specifically to FIG. 1 of the drawings, it will be seen that the cradle or frame 38 may be rearwardly displaced relative to the load bed 14 in a manner such that only the forward ends of the longitudinal members 40 and 42 of the frame 38 are supported from the roller assemblies 96 of the frame 82 and the depending wheel assemblies 80 rearwardly abut the forward side of the rear transverse member 86 of the frame 82. When in this position, the wheels 78 of the cradle or frame 38 may be rollingly engaged with an inclined surface 140 upon which the truck 10 is disposed and which slopes down into a body of water 142. When in this position, and with the hook 128 engaged with the bow eye 144 of a small lightweight boat 146 supported on the cradle or frame 38, the winch assembly 120 may be actuated through the crank 136 to unwind the cable 126 from the drum 122 whereby the boat 146 will roll rearwardly downwardly along the cradle or frame 138 and into the water 142.

When it is desired to again load the boat 146 into the load bed 14 of the pickup truck 10, the boat 146 is disposed rearwardly of the cradle or frame 138 (with the latter positioned as illustrated in FIG. 1 of the drawings) and the hook 128 is again engaged with the bow eye 144 of the boat 146. Then, the crank 136 is actuated to cause the cable 126 to be wound on the drum 122 whereby the boat 146 will be pulled upwardly onto and along the frame or cradle 138 with the keel of the boat being rollingly supported from the roller assembly 54 and the opposite side bottom portions of the boat 146 rollingly supported from the roller assemblies 52. As the bow of the boat 146 approaches the transverse member 60, the bow of the boat 146 is slightly downwardly depressed so as to be received within the notch 70 of the block 68 and further actuation of the winch assembly 120 to wind the cable 126 thereon will cause the boat 146 and the cradle or frame 138 to roll upwardly onto the load bed 14 with the opposite side longitudinal members 40 and 42 of the cradle or frame rollingly supported from the roller assemblies 96 of the frame 82.

When the boat 146 and cradle or frame 138 have been pulled up onto the load bed 14 of the truck 10 to the position thereof illustrated in FIG. 2 of the drawings, the boat 146 and cradle or frame 138 may be considered as fully loaded upon the truck 10 and the latter may be utilized to transport the boat 146 wherever desired.

The legs 72 carried by the opposite side forward portions of the cradle or frame 38 may be swung downwardly to the operative positions thereof illustrated in FIG. 1 of the drawings if it is ever desired to support the boat 146 from the frame or cradle 138 independently of the truck 10. After the legs 72 have been swung down to the operative positions thereof, the front end portion of the cradle or frame 38 may be slightly elevated and the truck 10 may be driven forwardly from beneath the forward end of the cradle or frame 38 after which the forward end of the cradle 38 may be lowered to a position with the lower end of the legs 72 supported from the ground.

The horizontal brace member 60 is vertically adjustable in order to adapt the frame or cradle 38 to receive different height boat bows thereon with the bow of the associated boat being snugly receivable in the notch 70. In addition, the loading assembly 106 illustrated in FIG. 11 may be used independently of the components 38 and 82, if desired. The loading assembly 106 may be conveniently utilized to pull various loads onto the load bed 14 of the pickup truck 10. Also, the lower ends of the sockets 114 include aligned opposite side bores 150 with which bores 152 formed through the lower ends of the stakes 110 and 112 are registered and locking pins 154 may be passed through each set of aligned bores 150 and 152 and locked against removal by padlocks 156 to prevent removal of the loading assembly 106.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A support upon and from which a small boat may be longitudinally loaded and unloaded, said support including an elongated frame having front and rear ends and opposite side longitudinal members, central keel roller means journalled from the rear of said frame centrally intermediate its opposite sides, opposite side roller means journalled from opposite side portions of said frame generally centrally intermediate its opposite ends, the forward ends of said longitudinal members including upright posts, and elevated elongated horizontal transverse abutment means supported from and extending between the upper end portions of said posts for vertical adjustment relative thereto and beneath which the upper bow portion of a small boat supported from said roller means may be snugly received.

2. In combination with a pickup truck of the type including a load bed spaced rearwardly of the cab of said truck and including a forward transverse wall extending between and interconnecting the forward ends of a pair of rearwardly extending opposite side walls provided with upwardly opening sockets spaced slightly rearwardly of said forward transverse wall, a loading device including a pair of upstanding stakes snugly downwardly telescoped into said sockets with the upper ends of said stakes projecting upwardly outwardly of said sockets and including front and rear sides, a horizontal brace member extending and connected between the forward sides of said stakes and downwardly abutted against the upper marginal edge of said front wall, and winch means carried by said brace member centrally intermediate its opposite ends.

3. The combination of claim 2 wherein said winch means includes a horizontal torque input shaft generally paralleling said brace member, a horizontal extension shaft aligned with said input shaft and one end thereof drivingly coupled thereto, the other end of said extension shaft extending along and toward one end of said brace member, said one end of said brace member including journal means journalling said other end of said extension shaft, and a crank carried by said other end of said extension shaft and operable outwardly of said one end of said brace member.

4. The combination of claim 2 including a depending abutment member carried by said brace member and projecting downwardly below the front side thereof for abuttingly engaging the upper marginal portion of the forward side of said forward transverse wall.

5. A support rack for extending the effective load bed length of a pickup truck rearwardly beyond the rear edge of the tailgate thereof when the tailgate is in a lowered position and with the rear ends of the sides of the load bed of the truck provided with inwardly offset upstanding structural corner posts, said rack including a generally rectangular horizontal frame provided with front and rear transverse members interconnected by means of front to rear extending opposite side longitudinal members, said frame being adapted to overlie said tailgate from slightly rearwardly of the rear marginal edge thereof and to extend forwardly over the rear marginal edge of the floor of the load bed to a position with said front transverse member spaced immediately forward of the lower ends of said posts, the opposite ends of said front transverse member projecting outwardly beyond the remote sides of the forward ends of said opposite side longitudinal members for rearwardly abutting the front sides of the lower ends of said posts and a pair of uprights carried by the opposite ends of said front transverse member for extending upwardly along and rearwardly abutting the front sides of said posts, and inclined tension members extending between and anchored relative to the upper end portions of said uprights and opposite side portions of the rear marginal edge of said rack.

6. The combination of claim 5 wherein said rear transverse member includes depending forwardly facing abutment means adapted to forwardly abut the rear marginal edge of said tailgate.

7. The combination of claim 5 wherein said depending forwardly facing abutment means includes forwardly projecting and upwardly facing abutment means spaced below said transverse member and adapted to upwardly abut the underside of the rear marginal edge of said tailgate.

8. In combination with a pickup truck of the type including a load bed having a front wall spaced slightly rearwardly of the rear wall of the cab of the pickup truck, a pair of opposite side longitudinal walls extending rearwardly from the front wall, a floor extending between and interconnecting the lower marginal edges of the front and opposite side walls, a tailgate hingedly supported at the rear end of the load bed for angular displacement between an upstanding position closing the rear end of the load bed and a horizontal rearwardly projecting open position defining a rearward extension of the rear end of the load bed, the rear ends of the side walls including inwardly offset structural posts and the forward ends of the upper marginal portions of said side walls including means defining upwardly opening stake receiving sockets, a support upon and from which a small boat may be longitudinally loaded and unloaded, said support including an elongated frame having front and rear ends and opposite longitudinal sides, central keel roller means journalled from the rear of said frame centrally intermediate its opposite sides, opposite side roller means journalled from opposite side portions of said frame generally centrally intermediate its opposite ends, elevated horizontal transverse abutment means supported from the forward end of said frame for vertical adjustment relative thereto and beneath which the upper bow portion of a small boat supported from said roller means may be snugly received, said support including opposite side longitudinal portions extending therealong and dependingly supported support wheels carried by the rear end of said support, a support rack for extending the effective load bed length of said pickup truck, said rack including a frame provided with front and rear transverse members interconnected by means of front to rear extending opposite side longitudinal members, said frame overlying said tailgate with the latter in its horizontal open position and extending from a point slightly rearwardly of the rear marginal edge of said tailgate forwardly over the rear marginal edge of the floor of the load bed to a position with the front transverse member of the rack frame spaced immediately forward of the lower ends of said posts, the opposite ends of said front transverse member of said rack frame projecting outwardly beyond the remote sides of the forward ends of said opposite side longitudinal members of said rack frame for rearwardly abutting the front sides of the lower ends of said posts, a pair of uprights carried by the opposite ends of said front transverse member of said rack frame extending upwardly along and rearwardly abutting the front sides of said posts, inclined tension members extending between and anchored relative to the upper end portions of said uprights and opposite side portions of the rear marginal portion of said rack frame, a pair of opposite side roller assemblies carried by the rear marginal edge of said rack frame and along which the opposite side longitudinal members of the boat support may be longitudinally rollingly supported, a loading device for said pickup truck, said loading device including a pair of upstanding stakes downwardly snugly telescoped into said sockets with the upper ends of said stakes projecting upwardly outwardly of said sockets, a horizontal brace member extending and connected between the forward sides of said stakes and downwardly abutted against the upper marginal edge of the front wall of said load bed, and winch means carried by said brace member centrally intermediate its opposite ends, said winch means including a journalled drum upon which an elongated tension member has one end thereof wound, the other end of said elongated tension member being adapted for releasable connection with the bow portion of a boat to be loaded onto said support and thereafter to be drawn upwardly onto said load bed while stationarily supported on said support.

9. The combination of claim 8 wherein said winch assembly includes a horizontal torque input shaft generally paralleling said brace member and drivingly connected to said drum, a horizontal extension shaft aligned with said input shaft and having one end thereof drivingly coupled to said input shaft, the other end of said extension shaft extending along and toward one end of said brace member, said one end of said brace member including journal means journalling said other end of said extension shaft, and a crank carried by said other end of said extension shaft and operable outwardly of said one end of said brace member.

10. The combination of claim 9 including a depending abutment member carried by said brace member and projecting downwardly below the front side thereof and rearwardly abuttingly engaging the forward side of the upper marginal portion of said forward transverse wall of said load bed.

11. The combination of claim 8 wherein said rear transverse member of said support rack includes depending forwardly facing abutment means adapted to forwardly abut the rear marginal edge of said tailgate.

12. The combination of claim 11 wherein said depending forwardly facing abutment means includes forwardly projecting and upwardly facing abutment means spaced below said rear transverse member of said support rack upwardly abutting the underside of the rear marginal edge of said tailgate.

13. The combination of claim 8 wherein the forward end of said small boat support includes opposite side upwardly retractable depending support legs.

14. In combination with a pickup truck of the type including a load bed having a front wall spaced slightly rearwardly of the rear wall of the cab of the pickup truck, a pair of opposite side longitudinal walls extending rearwardly from the front wall, a floor extending between and interconnecting the lower marginal edges of the front and opposite side walls, the forward ends of said side walls defining upwardly opening sockets spaced slightly rearwardly of said forward transverse wall, a loading device including a pair of upstanding stakes downwardly snugly telescoped into said sockets with the upper ends of said stakes projecting upwardly outwardly of said sockets and including front and rear sides, a horizontal brace member extending and connected between said stakes, and winch means carried by said brace member centrally intermediate its opposite ends, depending abutment means carried by said brace member adjacent said winch means and projecting downwardly below said brace member and rearwardly abutting the front side of said front wall.

15. The combination of claim 14 including means releasably locking said stakes in said sockets.

* * * * *